US005699450A

United States Patent [19]

Stearns et al.

[11] Patent Number: 5,699,450

[45] Date of Patent: Dec. 16, 1997

[54] DETECTOR ARRAY METHOD AND APPARATUS FOR REAL TIME IN SITU COLOR CONTROL IN PRINTERS AND COPIERS

[75] Inventors: Richard G. Stearns, Los Gatos; Steven E. Nelson, Mountain View, both of Calif.

[73] Assignee: Xerox Corporation, Stamford, Conn.

[21] Appl. No.: 397,323

[22] Filed: Feb. 28, 1995

[51] Int. Cl.$^{6}$ .............................. H04N 1/21; G06K 9/62; G03G 15/00

[52] U.S. Cl. .............................. 382/156; 358/296; 399/51; 395/109

[58] Field of Search .............................. 358/406, 504, 358/518, 530, 482, 483, 512, 296, 513, 514; 395/109; 355/214; 250/208.1, 553; 399/51; 382/156, 159

[56] References Cited

U.S. PATENT DOCUMENTS

| | | | |
|---|---|---|---|
| 4,701,790 | 10/1987 | Yamada . | |
| 4,961,615 | 10/1990 | Owechko et al. . | |
| 4,999,668 | 3/1991 | Suzuki et al. . | |
| 5,025,282 | 6/1991 | Nakamura et al. . | |
| 5,063,531 | 11/1991 | Shigeru et al. . | |
| 5,083,154 | 1/1992 | Terashita et al. . | |
| 5,109,275 | 4/1992 | Motohiko et al. . | |
| 5,119,132 | 6/1992 | Butler . | |
| 5,119,147 | 6/1992 | Hays . | |
| 5,121,467 | 6/1992 | Skeirik . | |
| 5,162,899 | 11/1992 | Naka et al. . | |
| 5,177,532 | 1/1993 | Takagi | 399/51 |
| 5,200,816 | 4/1993 | Rose . | |
| 5,285,295 | 2/1994 | Kai et al. . | |
| 5,313,252 | 5/1994 | Castelli et al. . | |
| 5,317,373 | 5/1994 | Bares . | |
| 5,317,651 | 5/1994 | Refregier et al. | 382/156 |
| 5,361,311 | 11/1994 | Wilson | 382/156 |

FOREIGN PATENT DOCUMENTS

| | | |
|---|---|---|
| 482 866 | 4/1992 | European Pat. Off. . |
| 492 451 | 7/1992 | European Pat. Off. . |
| 599 294 | 6/1994 | European Pat. Off. . |

OTHER PUBLICATIONS

Applied Optics, vol. 31, No. 29, Oct. 10, 1992, pp. 6230–6239, XP000304312 Stearns R.G.: "Trainable Optically Programmed Neural Network".

Richard P. Lippmann, "An Introduction to Computing with Neural Nets", IEEE ASSP Magazine, Apr. 1987.

D.E. Rumelhart, G.E. Hinton, and R.J. Williams, "Learning Internal Representations by Error Propagation", Chapter 8.

Bernard Widrow and Rodney Winter, "Neural Nets for Adaptive Filtering and Adaptive Pattern Recognition", Computer, Mar. 1988.

Bernard Widrow and Michael A. Lehr, "30 Years of Adaptive Neural Networks: Perceptron, Madaline, and Backpropagation", IEEE, vol. 78, No. 9, Sep. 1990.

Teuvo Kohonen, "The Neural Phonetic Typewriter", IEEE, Mar. 1988.

(List continued on next page.)

*Primary Examiner*—Edward L. Coles, Sr.
*Assistant Examiner*—Kimberly A. Williams
*Attorney, Agent, or Firm*—Fay, Sharpe, Beall Fagan, Minnich & McKee

[57] ABSTRACT

A detector array method and apparatus for real time in-situ color control in printers and copiers includes an array for performing a linear matrix transformation on color patch information generated by a printer or copier. A light sensor array detects color components from a series of color test patches and performs a predetermined matrix transformation on the color information to produce a set of control signals for feedback to the printer or copier. In another embodiment, the light sensor array is extended to produce a fully analog neural network processor which is capable of arbitrary mappings of the color information into control signals for use by the printer or copier apparatus. The system is fully programmable, adaptive and, in one embodiment, trainable using backpropagation or other techniques.

20 Claims, 6 Drawing Sheets

OTHER PUBLICATIONS

Derrick H. Nguyen and Bernard Widrow, "Neural Networks for Self–Learning Control Systems", Control Systems Magazine, IEEE 1990.

R.G. Stearns, "A Neural Network That Incorporates Direct Optical Imaging", Appl.

R.G. Stearns, "Trainable optically programmed neural network," Appl. Opt. 31(29), 6230.

R.G. Stearns and R.L. Weisfield, "Two–dimensional amorphous–silicon photoconductor array for optical imaging," Appl. Opt. Nov. 1992.

R.G. Stearns, "An optically programmed neural network capable of standalone operation," submitted to Appl. Opt.

DETECTOR ARRAY METHOD AND APPARATUS FOR REAL TIME IN SITU COLOR CONTROL IN PRINTERS AND COPIERS

BACKGROUND OF THE INVENTION

1. Field of the Invention

The present invention relates generally to methods and apparatus for real-time processing of color patch information in a color electrophotographic printing machine and, more particularly, to methods and apparatus for real-time color control in a copier apparatus through a matrix transformation of color patch information obtained by a programmable detector array. The transformation may be static and preprogrammed, dynamic and programmable, or adaptive and non-linear for training to operate in a range of machines at various operating set points.

2. Description of the Prior Art

In an electrophotographic printing machine, the photoconductive member is charged to a substantially uniform potential to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing marking or toner particles into contact therewith. This forms a powder image on the photoconductive member which is subsequently transferred to a copy sheet. The copy sheet is heated to permanently affix the marking particles thereto in image configuration.

Various types of development systems have herein before been employed. These systems utilize two (2) component developer mixes or single component developer materials. Typical two component developer mixes generally include dyed or colored thermoplastic powders, known in the art as toner particles, which are mixed with coarser carrier granules, such as ferromagnetic granules. The toner particles and carrier granules are selected such that the toner particles acquire the appropriate charge relative to the electrostatic latent image recorded on the photoconductive surface. When the developer mix is brought into contact with the charged photoconductive surface, the greater attractive force of the electrostatic latent image recorded thereon causes the toner particles to transfer from the carrier granules and adhere to the electrostatic latent image leaving the carrier granules behind.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner particles of a color complimentary thereto. This process is repeated in series over a plurality of cycles for differently colored images and their respective complimentary colored toner particles. For example, a red filtered light image is developed with cyan toner particles, while a green filtered light image is developed with magenta toner particles and a blue filtered light image with yellow toner particles. Each single color toner powder image is transferred to the copy sheet superimposed over the prior toner powder image. This creates a multi-layered toner powder image on the copy sheet. Thereafter, the multi-layered toner powder image is permanently affixed to the copy sheet creating a color copy. An illustrative electrophotographic printing machine for producing color copies is the Model No. 1005 made by the Xerox Corporation.

It is evident that in printing machines of this type, color toner particles are depleted from the developer mixture. The ratio of toner particles to carrier granules constantly changes and generally decreases over time. As the concentration of toner particles decreases, the color quality of the resultant copy degrades. In order to maintain the copies being reproduced at a specified minimum quality, it is necessary to first monitor color quality and then regulate the concentration of toner particles in the developer mixture or otherwise control the various steps in the color reproduction process. Moreover, sensing of the concentration of individual primary colors, i.e. red, green and blue, in a color copy provides valuable input for process control at the individual development stations as well as other stations of the electrophotographic printing machine.

Other factors affect the copy quality as well. These factors include the temperature and humidity of the copy machine, various changing levels of the electrostatic components within the machine and intensity or effectiveness of the laser scanning light source, to name a few.

Color copy quality can be controlled by various known techniques, one of which includes monitoring an electromagnetic property of the developer, such as permeability, permitivity or conductivity, to obtain information regarding the carrier-toner ratio. This method is only marginally effective since the color quality is measured indirectly. Monitoring the changing and development voltages also provide only an indirect measurement of color quality.

It would be desirable to provide a more direct and effective control system in a color printing or digital copying apparatus in order to maintain good color reproduction through multiple prints or copies. Such a system should ideally operate in near real-time and compensate for time-dependent parameter changes such as machine warming during operation, changes in ink or toner concentration, fluxuations in xerographic development, effects of humidity, etc. The color copy control system should be simple, with minimal impact on printer architecture and would ideally further be adaptable in order that it may be functional at a plurality of nominal and selectable operating points such as, for example, as parts of machine may be replaced or periodically upgraded.

It would be further desirable to provide an effective control system which operates substantially in real-time for in situ control of color printers and copiers using neural network techniques for training the control system to operate in conjunction with a plurality of machines and over a plurality of programmable set point conditions.

SUMMARY OF THE INVENTION

In accordance with the present invention, a method and apparatus is provided for real-time in situ processing of color patch information for control of direct reading and color quality in an electrophotographic printing machine. The processing includes performing a matrix transformation of color patch information obtained by a detector array disposed in the electrophotographic printing machine to detect incident reflected light from a color patch. In a first embodiment, the matrix transformation operation is linear and static, based upon preprogrammed parameters. In another embodiment, the matrix transformation is linear and dynamic for operation in response to parameters which are variable on-the-fly. In accordance with yet another embodiment of the invention, the matrix transformation is non-linear, adaptive and trainable for use in a plurality of different electrophotographic printing apparatus operating at various selectable set points.

One advantage of the present invention is that control signals are generated for regulating the color quality in an electrophotographic printing machine by real-time processing of actual physical color patch information generated by the machine. The control signals are used to ensure that time dependent parameters such as changes in ink or toner concentration which affect color quality are regulated.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

While the present invention will hereinafter be described in connection with the preferred embodiments thereof, it will be understood that it is not intended to limit the invention to those embodiments. On the contrary, it is intended to cover all alternatives, modifications and equivalents as may be included within the spirit and scope of the invention as defined by the appended claims. As an example, although the color control processing systems of the present invention are described in connection with an electrophotographic printing apparatus, the invention finds utility whenever color patch feedback information or color quality control are required.

Figure 1:
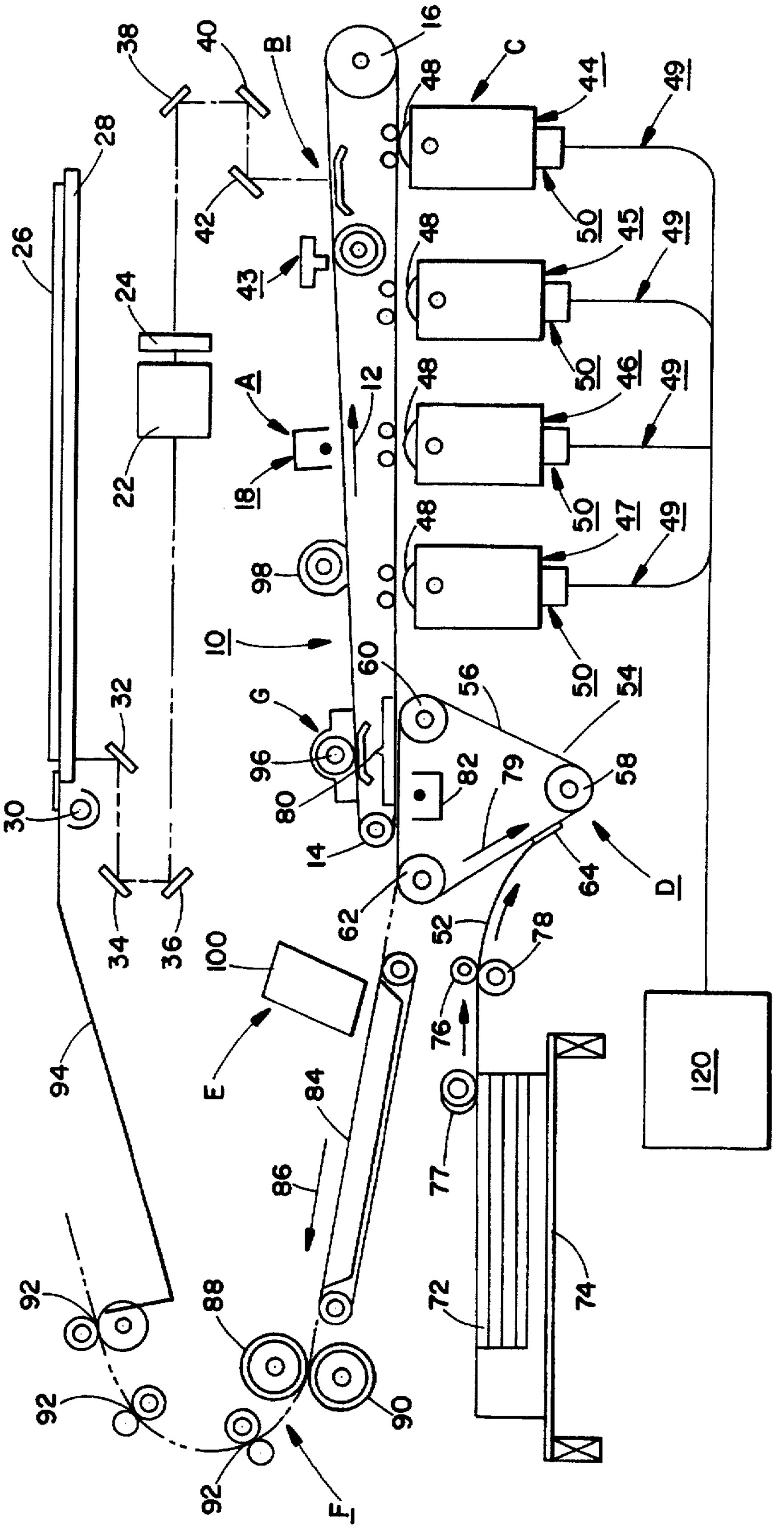
FIG. 1 is a schematic elevational view depicting an electrophotographic printing machine incorporating the color control processing system of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating a color quality processing method and apparatus of the present invention therein. It will become evident from the following discussion that the methods and apparatus of the present invention are equally well suited for use in any electrostatographic printing and/or copying machine including digital copiers, and is not necessarily limited in its application to the particular electrophotographic printing machine shown herein.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a photoreceptor, i.e. a photoconductive belt 10. Preferably, the photoconductive belt 10 is made from a photoconductive material coated on a grounding layer, which, in turn, is coated on an anti-curl backing layer. The photoconductive material is made from a transport layer coated on a generator layer. The transport layer transports positive charges from the generator layer. The interface layer is coated on the grounding layer. The transport layer contains small molecules of di-m-tolydiphenylbiphenyldiamine dispersed in polycarbonate. The generation layer is made from trigonal selenium. The grounding layer is made from a titanium coated Mylar which is very thin and allows light to pass therethrough. Other suitable photoconductive materials, grounding layers, and anti-curl backing layers may also be employed. Belt 10 moves in the direction of arrow 12 to advance successive portions of the photoconductive surface sequentially through the various processing stations disposed about the path of movement thereof. Belt 10 is entrained about idler roller 14 and drive roller 16. Idler roller 14 is mounted rotatably so as to rotate with belt 10. Drive roller 16 is rotated by a motor coupled thereto by suitable means such as a belt drive. As roller 16 rotates, it advances belt 10 in the direction of arrow 12.

Initially, a portion of photoconductive belt 10 passes through charging station A. At charging station A, a corona generating device, indicated generally by the reference numeral 18 charges photoconductive belt 10 to a relatively high, substantially uniform potential.

Next, the charged photoconductive surface is rotated to exposure station B. Exposure station B includes a moving lens system, generally designated by the reference numeral 22, and a color filter mechanism, shown generally by the reference number 24. An original document 26 is supported stationarily upon a transparent viewing platen 28.

Successive incremental areas of the original document are illuminated by means of a moving lamp assembly, shown generally by the reference numeral 30. Mirrors 32, 34 and 36 reflect the light rays through lens 22. Lens 22 is adapted to scan successive areas of illumination of platen 28. The light rays from lens 22 are transmitted through filter 24 and reflected by mirrors 38, 40 and 42 onto the charged portion of photoconductive belt 10. Lamp assembly 30, mirrors 32, 34 and 36, lens 22 and filter 24 are moved in a timed relationship with respect to the movement of photoconductive belt 10 to produce a flowing light image of the original document on photoconductive belt 10 in a non-distorted manner.

During exposure, filter mechanism 24 interposes selected color filters into the optical light path of lens 22. The color filters operate on the light rays passing through the lens to record an electrostatic latent image, i.e. a latent electrostatic charge pattern, on the photoconductive belt corresponding to a specific color of the flowing light image of the original document.

As an alternative to the above exposure system, a digitally modulated light source (not shown) such as a scanning laser or light emitting diode array may be used in connection with each of the developer units 44–47 described below. A separate developer unit would be used for each of the primary colors. A two level (i.e. full-on or full-off) laser ROS is an example. Areas on the belt 10 exposed to the ROS output contain discharged areas which correspond to background areas and charged areas which correspond to image areas. Typically, a computer program stored in an electronic subsystem ESS (not shown) is used to generate digital information signals for operating the ROS in accordance with the latest images to be formed on the belt 10.

Exposure station B also includes a color test pattern generator, indicated generally by the reference numeral 43, comprising a light source to project a test color image matrix or array onto the charged portion of the photoconductive surface in the inter-image region, i.e. the region between successive electrostatic latent images recorded on photoconductive belt 10, to record a test area. The test area, as well as the electrostatic latent image recorded on the photoconductive surface of belt 10 are developed with toner particles at a development station C.

After the electrostatic latent image and color test area have been recorded on photoconductive belt 10, belt 10 advances them to the development station C. Development station C includes four individual developer units generally indicated by the reference numerals 44–47.

The developer units are of a type generally referred to in the art as "magnetic brush development units." Typically, a magnetic brush development system employs a magnetizable developer material including a magnetic carrier granules having toner particles adhering triboelectrically thereto. The developer material is continually brought through a directional flux field to form a brush 48 of developer material. The developer particles are continually moving so as to provide the brush 48 consistently with fresh developer material. Development is achieved by bringing the brush 48 of developer material into contact with the photoconductive surface.

Developer units 44–47, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum corresponding to the wavelength of light transmitted through the filter. For example, an electrostatic latent image formed by passing the light image through a green filter will record the red and blue portions of the spectrums as areas of relatively high charge density on photoconductive belt 10, while the green rays will pass through the filter and cause the charge density on the photoconductive belt 10 to be reduced to a voltage level ineffective for development. The charged areas are then made visible by having developer unit 44 apply green absorbing (magenta) toner particles onto the electrostatic latent image recorded on a photoconductive belt 10. Similarly, a blue separation is developed by developer unit 45 with blue absorbing (yellow) toner particles, while the red separation is developed by developer unit 46 with red absorbing (cyan) toner particles. Developer unit 47 contains black toner particles and may be used to develop the electrostatic latent image formed from a black and white original document. The yellow, magenta and cyan toner particles are diffusely reflecting particles. Each of the developer units 44–47 is selectively moved into and out of the operative position. In the operative position, the magnetic brush 48 is closely adjacent the photoconductive belt, while, in the non-operative position, the magnetic brush 48 is spaced therefrom. During development of each electrostatic latent image only one developer unit is in the operative position, the remaining developer units are in the non-operative position. This insures that each electrostatic latent image and successive test areas are developed with toner particles of the appropriate color without co-mingling. In FIG. 1, developer unit 44 is shown in the operative position with developer units 45–47 being in the non-operative position.

For each of the developer units 44–47, toner concentration decreases as toner particles are applied to the photoconductive belt 10. Toner concentration affects color reproduction quality. Accordingly, each of the developer units 44–47 is provided with a combined toner concentration and developer temperature sensing head or sensor 50 coupled on a control and signal line pair 49 to a machine main processing unit 120 for processing of concentration and temperature signals to control the toner mixture according to a built-in machine algorithm. The structure and operation of these components are well known in the art.

After development, the toner image is moved to transfer station D where the toner image is transferred to a sheet of support material 52, such as plain paper for preferred example. At transfer station D, the sheet transport apparatus, indicated generally by the reference numeral 54, moves sheet 52 into contact with photoconductive belt 10. Sheet transport apparatus 54 has a pair of spaced belts 56 entrained about three rolls 58, 60 and 62. A gripper 64 extends between belts 56 and moves in unison therewith. Sheet 52 is advanced from a stack of sheets 72 disposed on tray 74. Feed roll 77 advances the uppermost sheet from stack 72 into the nip defined by forwarding rollers 76 and 78. Forwarding rollers 76 and 78 advance sheet 52 to the sheet transport 54. Sheet 52 is advanced by forwarding rollers 76 and 78 in synchronism with the movement of gripper 64. In this way, the leading edge of sheet 52 arrives at a preselected position to be received by the open gripper 64. The gripper 64 then closes, securing the sheet thereto for movement therewith in a recirculating path. The leading edge of the sheet is accrued releasably by gripper 64. As the belts move in direction of arrow 79, the sheet 52 moves into contact with the photoconductive belt, in synchronism with the toner image developed thereon, at a transfer zone 80. A corona generating device 82 sprays ions onto the backside of the sheet so as to charge the sheet to the proper magnitude and polarity for attracting the toner image from photoconductive belt 10 thereto. Sheet 52 remains secured to gripper 64 so as to move in a recirculating path for three cycles. In this way, three different color toner images are transferred to sheet 52 in superimposed registration with one another. Thus, the aforementioned steps of charging, exposing, developing, and transferring are repeated a plurality of cycles to form a multi-color copy of a colored original document.

After the last transfer operation, grippers 64 open and release sheet 52. Conveyor 84 transports sheet 52 in the direction of arrow 86, past the imaging station E to fusing station F where the transferred image is permanently fused to sheet 52. Although the imaging station E is illustrated upstream of the fusing station F according to the present invention, the color test patch imaging may be performed anywhere in the process after the development of the image. The details of the imaging station E will be discussed below with reference to FIGS. 2–8. In any case, fusing station F includes a heated fuser roll 88 and a pressure roll 90. Sheet 52 passes through the nip defined by fuser roll 88 and pressure roll 90. The toner image contacts fuser roll 88 so as to be affixed to sheet 52. Thereafter, sheet 52 is advanced by forwarding roll pairs 92 to catch tray 94 for subsequent removal therefrom by the machine operator.

For the sake of completeness of discussion, the last processing station in the direction of movement of belt 10, as indicated by arrow 12, is cleaning station G. A rotatably mounted fibrous brush 96 is positioned in cleaning station G and maintained in contact with photoconductive belt 10 to remove residual toner particles remaining after the transfer operation. Thereafter, lamp 98 illuminates photoconductive belt 10 to remove any residual charge remaining thereon prior to the start of the next successive cycle.

Figure 2:
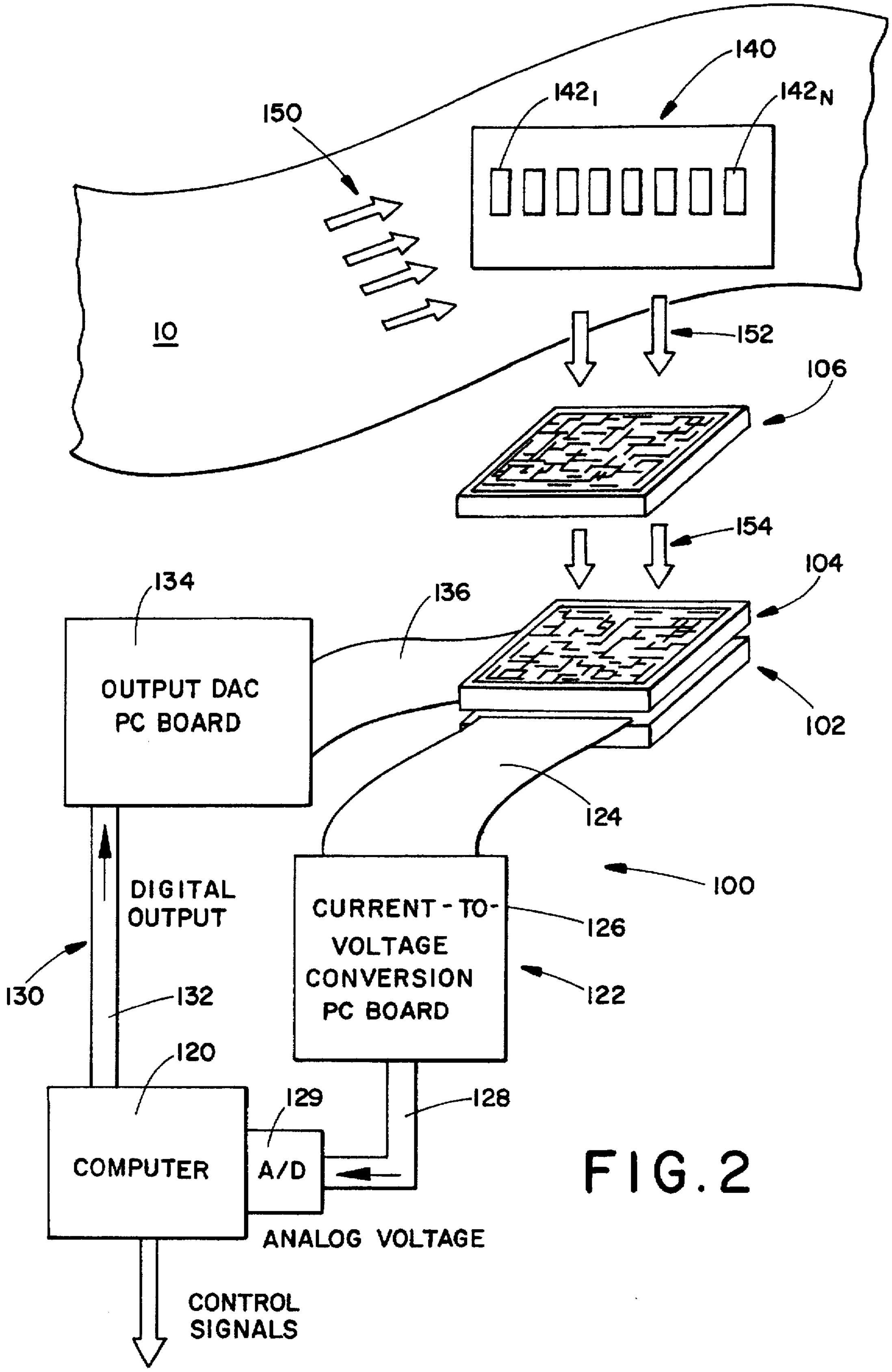
FIG. 2 is a schematic illustration showing a first preferred color control processing system for color patch information detection and processing according to the subject invention.

Referring now to FIG. 2, the color patch imaging and information processing system 100 of the imaging station E according to a first preferred embodiment of the present invention is illustrated schematically. The system 100 generally includes a light sensor array 102 which is held over the drum or belt 10 of the electrophotographic printing machine as represented in FIG. 1. A spatial light modulator array 104 and a color filter array 106 are disposed between the light sensor array 102 and the photoconductive belt 10.

The light sensor array 102 is connected to the machine main processing unit 120 of the electrophotographic printing machine through an input interface network indicated generally by the reference numeral 122. The network includes an input ribbon cable 124 which includes a plurality of spaced apart and electrically isolated conductors for interfacing the light sensor array 102 with a current to voltage conversion unit 126. As will be described below in greater detail, the light sensor array 102 generates a plurality of analog current signals which directly represent color quality information derived from the test color image matrix or array deposited on the belt by the generator 43 described above. However, in some copiers in order for the current signals to be interpreted and appropriately processed by the processing unit 120, they must first be converted to a voltage signal. The further conversion processing is performed in the embodiment illustrated by a current to voltage conversion unit 126.

The plurality of analog voltage signals from the conversion unit 126 are communicated to the machine main processing unit 120 via an input signal cable 128 and an analog to digital conversion unit 129. The task of the analog to digital conversion unit 129 is to convert the plurality of analog voltage signals originating from the current to voltage conversion unit 126, into digital signals for processing by the main processing unit 120. The functions of the analog to digital conversion unit 129 and the current to voltage conversion unit 126 may be combined into a single unit or further may equivalently be made part of the processing unit as an alternative to the above preferred arrangement. Other combinations such as direct use or implementation is a control sense of the analog signal from the array 102 will also come to mind to those skilled in the art.

The processing unit 120 performs a variety of data processing operations according to methods described in greater detail below to produce a plurality of digital output control signals on an output interface network 130 which includes an output signal cable 132. Since the programmable spatial light modulator array 104 of the preferred embodiment requires an analog control input, a digital to analog conversion unit 134 is provided as an interface between the array to the processing unit. An output ribbon cable 136 including a plurality of spaced apart and electrically isolated conductive wires connects the spatial light modulator array 104 with the digital to analog conversion unit 134. Accordingly, the machine main processing unit 120 controls the modulator array based upon a predetermined algorithm or pre-established set of signals stored in a memory.

Overall, the system illustrated in FIG. 2 uses the novel sensor architecture and processing methods described below to realize color quality sensing with real-time processing for feedback and machine control. The arrangement of the light sensor array 102 and spatial light modulator 104 is inherently inexpensive and configurable as an adaptive system through proper programming of the processing unit 120 to effect desired changes in the spatial light modulator array 104. In an alternative embodiment, a more simple but less flexible static real-time color quality processing system is realized by simply substituting the programmable spatial light modulator with a fixed value filter such as a piece of photographic film.

Figure 3:
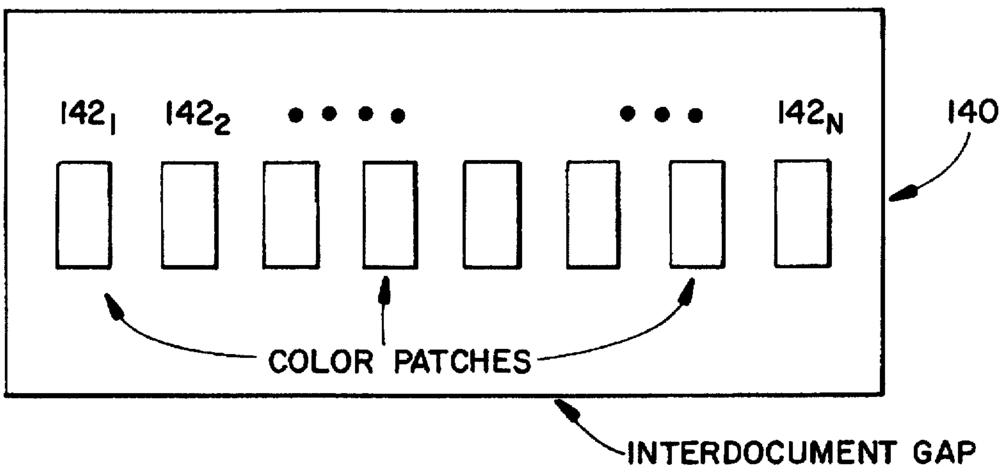
FIG. 3 is an enlarged view of a color patch produced by the electrophotographic printing machine of FIG. 1.

In operation, the color patch imaging and information processing system 100 acts in cooperation with a multiple color test pattern 140 produced by the color test patch generator 43 of the electrophotographic printing apparatus described in connection with FIG. 1. The color test pattern 140 is a printed color patch placed on the drum, belt or directly onto the paper itself during the printing operation. Further, the color test pattern 140 includes a plurality of color patches $142_1$–$142_N$ which are best illustrated in FIG. 3. One preferred location for the plurality of patches to be developed and sensed is in the interdocument gap. However, other locations are also contemplated and feasible such as along the edge of the belt or drum, on the image development area itself for unused development cycles, or alternatively on the paper sheets themselves following transfer of the image such as shown in FIG. 1. With continued reference to FIG. 2, however, the series of color patches $142_1$–$142_N$ are arranged on the belt in a linear array having a predetermined orientation. Although not illustrated in the figure, a two-dimensional matrix of color patches may be produced on the belt as well for two-dimensional color patch imaging and information processing. The test patch may span the width of the belt 10 or, preferably, is sized to be only large enough to accommodate the plurality of primary colors in a spaced apart relationship within the focal precision of the sensor array. Extensions of the principles of operation of the linear array described below to that for use in a two dimensional matrix are straightforward for those skilled in the art. For ease of discussion here, a linear array arrangement will be referenced to facilitate an understanding of the invention.

According to the fundamental principals of the present invention, the color patch imaging and information processing system 100 detects the basic color components, i.e., red, green, and blue, of each of the color patches $142_1$–$142_N$ using the filter array 106 and modulator array 104 and then performs a predetermined matrix transformation on this color information to produce a set of control signals for direct feedback to the electrophotographic printing machine. The filter 106 separates the reflected light signal 152 into basic colors and the modulator 104 alters those separated basic colors before they reach the detector array 102. A plurality of prisms may be used in place of the filter array 106. The imaging and processing is executed in real-time and in-situ.

Using thin film and various depositing techniques available, the plurality of discrete color filters comprising the array 106 may be disposed directly onto the sensor array itself. More particularly, it is contemplated within the spirit and scope of the present invention that the color filter and detector arrays may be fabricated together on a single common substrate. Accordingly, the spatial separation illustrated in FIG. 2 between these arrays is grossly exaggerated for the purposes of illustrating the invention only and not for the purpose of limiting same.

In order to perform the color quality analysis functions of the present invention, the imaging portion of the system including the light sensor array 102, spatial light modulator array 104 and the color filter array 106 are disposed over the belt 10 which is appropriately illuminated by a light source 150 at the imaging station E. As the color test pattern 140 passes near the imaging portion of the system 100, a reflected light signal 152 is generated by reflection from the color test patch 140 and received by the color filter array 106. After filtering to remove undesired primary color components, a filtered light signal 154 is generated and directed to fall incident on the spatial light modulator array 104. Those skilled in the art, however, would appreciate that the color filter array 106 may be disposed between the light sensor array 102 and the spatial light modulator array 104 .to achieve equivalent results.

Figure 4:
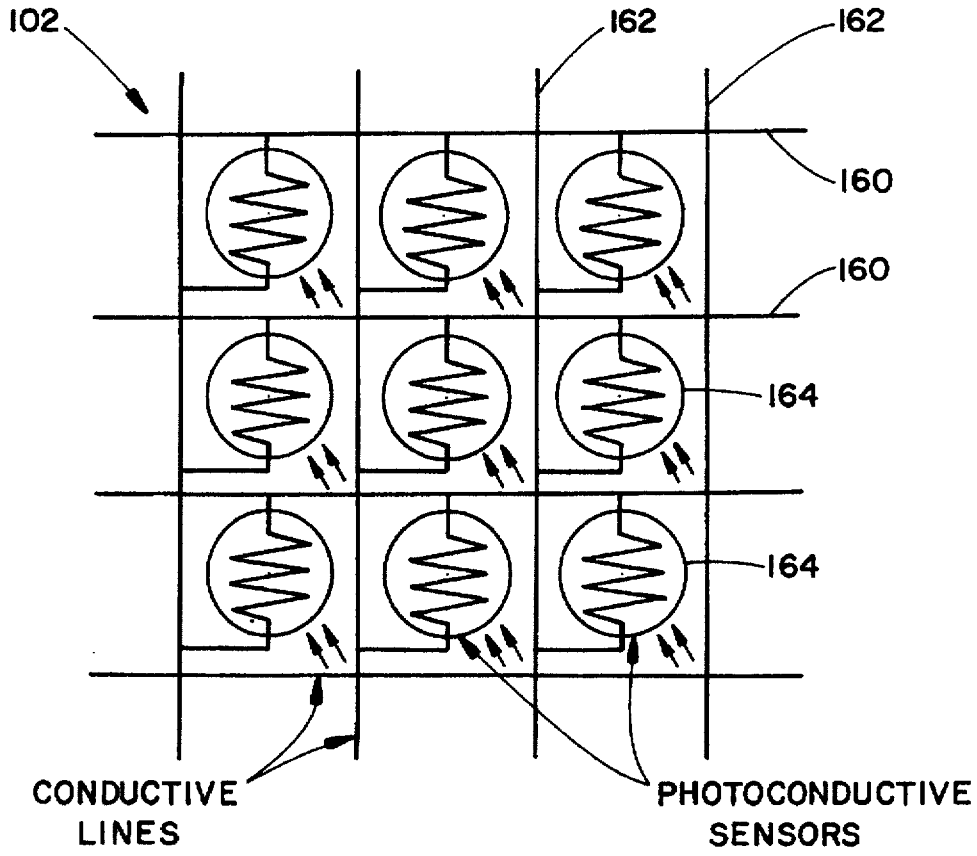
FIG. 4 is a schematic view of a preferred photoconductive array used in the system of FIGS. 2 and 7.

With reference now to FIG. 4, an enlarged portion of the light sensor array 102 is shown schematically. The array consists of a grid of conductive lines 160, 162 which each lie in parallel with two sets of basis vectors. In the preferred embodiment, the basis vectors are orthogonal so that the array 102 consists of a grid of horizontal and vertical conductive lines 160, 162 respectively. Between the two sets of conductive lines is a dielectric layer for electrical isolation. At each node of this grid a photoconductive element 164 is fabricated as shown in FIG. 4. The photoconductor is preferably a thin film of intrinsic hydrogenated amorphous silicon (a-Si:H) which is deposited on a glass substrate such as described in *Two-Dimensional Amorphous-Silicon Photoconductor Array for Optical Imaging*, Applied Optics, Vol. 31, No. 32, Nov. 10, 1992 by Richard G. Stearns and Richard L. Weisfeld, the teachings of which are incorporated herein by reference.

Figure 5:
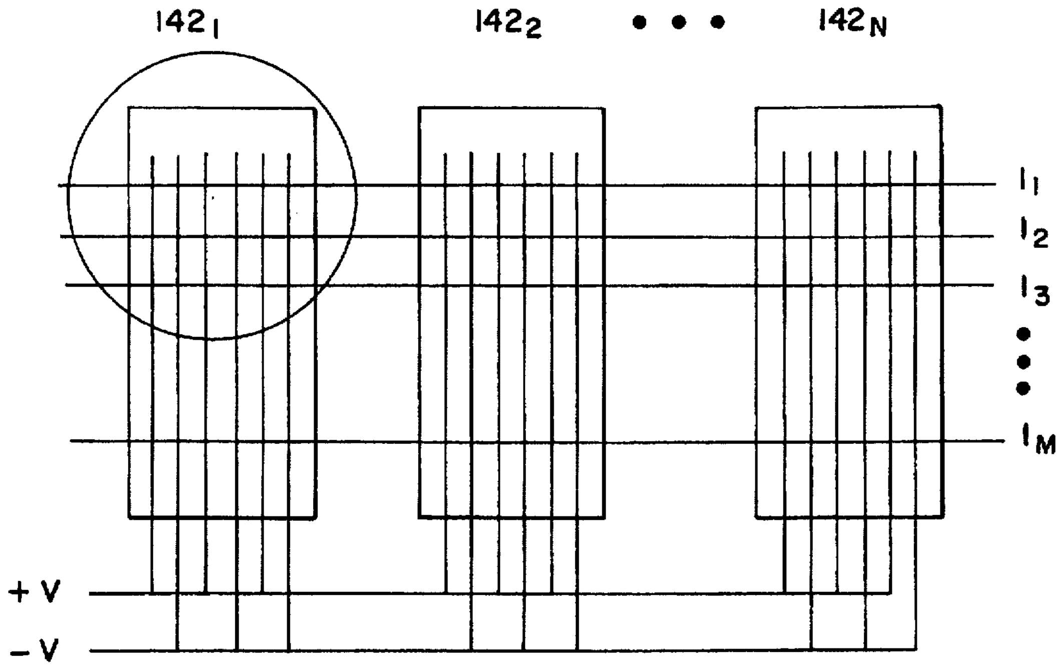
FIG. 5 is a schematic functional illustration of the photoconductive array of FIG. 4 disposed over the color patch of FIG. 3 according to the teachings of the invention.

FIG. 5 presents a schematic illustration of the light sensor array 102 disposed in overlying registration with the plurality of color patches $142_1$–$142_N$. As can be seen from that illustration, a plurality of photoconductive elements 164 are provided for each of the color patches. Although the imaging of the modulated light signal 156 may require the use of lenses, the preferred embodiment relies upon simple proximity of the light sensor array to the drum since the spatial resolution is not critical. In the preferred embodiment, each of the individual color patches $142_1$–$142_N$ are quite large, e.g. several millimeters in lateral dimension, in comparison with the photoconductive elements 164 which are much smaller.

As shown in FIG. 5, a photoconductive sensor 164 is associated with each of the nodes of the grid of conductive lines 160, 162 formed in the light sensor array 102. An enlarged portion of a single one of the color patches $142_1$–$142_N$ is illustrated in a magnified form in FIG. 6.

Referring now to that Figure in detail, a red color filter element 170 comprising the multi-color filter array 106 is disposed over the active area of a selected plurality of photoconductive elements 164. In the preferred embodiment, three different type color filters are used i.e. red, green and blue representing the primary colors. However, other color filters may be implemented based on a particular application to separate the reflected light signal 152 into different components according to wavelength. Green color filters 172 and blue color filters 174 are disposed over the active areas of selected pluralities of the photoconductive elements 164. Other possible primary colors suitable for use in this invention include magenta, yellow and cyan.

Figure 6:
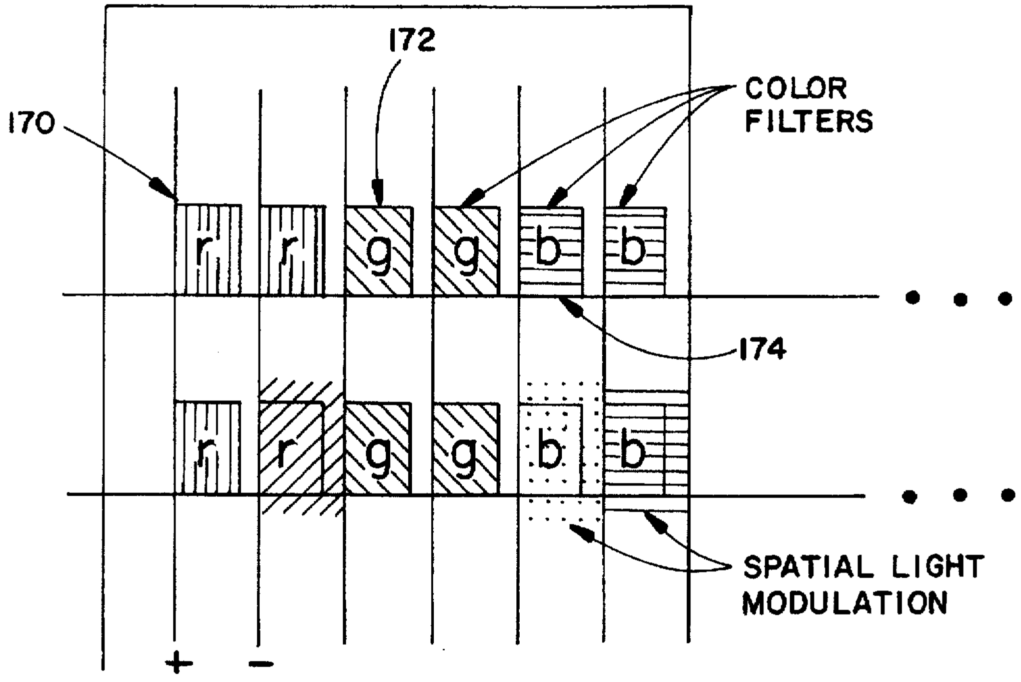
FIG. 6 is a schematic illustration of a color filter and spatial light modulation array used in conjunction with the system illustrated in FIG. 2.

With reference to FIGS. 5 and 6 in combination, a single photoconductive element is disposed under each of the color filter elements 170, 172, 174 as well as under each of an array of spatial light modulation elements 180. A first voltage signal +V is applied to a first set of vertical conductive lines 162 while a second set of the conductive lines are connected to a second voltage source −V. In the preferred embodiment, the voltage k=levels are typically about 10 volts.

The current in each of the horizontal conductive lines $160_1$–$160_m$ corresponds to the amount of light incident on each of the plurality of photoconductive elements 164. Each of the individual currents $I_1$–$I_M$ correspond to the weighted sum of the voltages at each of the vertical conductive lines 162 which cross over the respective horizontal conductive lines $160_1$–$160_M$. The weighting corresponds to the photoconductance at each crossing node.

As an example, a single current $I_j$ corresponds to the weighted sum of the voltages on each of the vertical lines 162 which cross over the horizontal line 160*j*, with the weighting corresponding to the photoconductance at each crossing node. For purposes of this example, $C_i$ is defined to be the light flux from color patch number 142*i* incident on each color filter of the sensor array, to which that patch is imaged. We assume for simplicity that the light is imaged uniformly across the sensors corresponding to each patch. Next, given the specific filter array discussed above, we consider the light flux $C_i$ to be composed of three quantities $R_i$, $G_i$, and $B_i$, so that $C_i=(R_i, G_i, B_i)$ is a vector in RGB space. Thus, the color filters serve the purpose of measuring the component of the vector $C_i$ along the axis corresponding to that color.

Next in this mathematical description of the processing system 100, the transmission coefficients of the spatial light modulator over sensors of color patch 142*i*, corresponding to horizontal line j, and red color filters 170, green 172, and blue 174 are defined to be $T_{rij}+$, $T_{gij}+$, and $T_{bij}+$, when the underlying sensors are associated with a vertical conductive line of voltage +V. The transmission coefficients are defined as $T_{rij}-$, $T_{gij}-$, and $T_{bij}-$, when the underlying sensors are associated with a vertical conductive line of voltage −V. Finally, in the preferred embodiment illustrated, the photoconductance of each physical underlying sensor node is written as G=αF, where F is the light flux incident on the underlying sensor. With these relations, the current $I_j$ is written in the form:

$$I_j = \alpha V \sum_i [R_i(T_{rij}^{+} - T_{rij}^{-}) + G_i(T_{gij}^{+} - T_{gij}^{-}) + B_i(T_{bij}^{+} - T_{bij}^{-})]$$

The quantities $(T_{xij}{}^{+} - T_{xij}{}^{-})$, where x=r, g or b, may be lumped together and written simply as $T_{xji}$, a bipolar quantity. Both $T_{xij}+$ and $T_{xij}-$ are individually monopolar, and their combination is needed to product a bipolar value which is why vertical lines of ±V are utilized. The current $I_j$ in the horizontal conductive line 160*i* is therefore written as:

$$I_j = \alpha V \Sigma [R_i(T_{rij}) + G_i(T_{gij}) + B_i(T_{bij})]$$

The above relation is seen to be that of a vector-matrix product, where the vector $C_{total}$ corresponds to the total color patch information $$C_{total} = (R_1, G_1, B_1, R_2, G_2, B_2, \ldots, R_N, G_N, B_N)$$

contained in the test patch 140.

The transmission matrix $T_{total}$ corresponds to the light modulator array:

$$T_{total} = \begin{bmatrix} T_{r11} & T_{r12} & \cdots & T_{r1M} \\ T_{g11} & T_{rg12} & \cdots & T_{1M} \\ T_{b11} & T_{b12} & \cdots & T_{b1M} \\ T_{r21} & T_{r22} & \cdots & T_{r2M} \\ T_{g21} & T_{g22} & \cdots & T_{g2M} \\ T_{b21} & T_{b22} & \cdots & T_{b2M} \\ \cdot & \cdot & & \cdot \\ \cdot & \cdot & & \cdot \\ \cdot & \cdot & & \cdot \\ T_{rN1} & T_{rN2} & \cdots & T_{rNM} \\ T_{gN1} & T_{gN2} & \cdots & T_{gNM} \\ T_{bN1} & T_{bN2} & \cdots & T_{bNM} \end{bmatrix}$$

The output of the vector-matrix product $C_{total} * T_{total}$ is the vector of current $I_{out} = (I_1, I_2, \ldots, I_M)$ obtained from the horizontal conductive lines 160$_1$–160$_m$ of the light sensor array 102.

Thus, the total color patch information $C_{total}$ is contained in the current signals generated in the light sensor array 102 combined with the programmable transmission coefficients at the spatial light modulator array 104. The resulting current signals are generated by the sensor array in real time and represent color quality information according to the formula:

$$I_{out} = C_{total} * T_{total}.$$

The currents $I_{out}$ thus are empirical data representing an arbitrary matrix transformation of the entire color patch information $C_{total}$ associated with all of the printed test patches 142$_1$–142$_N$. The output currents $I_{out}$ originating from the light sensor array 102 are preferably used directly in a feedback control system within the electrophotographic duplicating machine 10 to maintain good color production and faithful reproduction. Alternatively, the current vector $I_{out}$ may be used directly by the various controllable subsystems of the duplicating machine such as, for example, by the charging and development stations for control of the charging and development voltages respectively. The arbitrary programmable matrix transformation is a simple yet powerful tool for representing complicated color copy situations making it possible to generate a quite complicated and subtle set of control signals.

As a primitive example of the power of the matrix transformation according to the present invention, a very simple feedback signal can be considered that might be associated with the amount of toner from the three primary colors that are being output by the electrophotographic printing machine 10 illustrated in FIG. 1 from toner in the developer units 44–46. For simplicity of discussion, we will now assume that the three toner colors are red, green and blue. In order then to associate the current $I_j$ in the horizontal sensor line 160$_j$ with the amount of red toner that the machine is depositing, the computer 102 sets all $T_{bij}$ and $T_{gij}$ of the spatial light modulator array 104 to 0 through the output interface network 130. All of the transmission values $T_{rij}$ are set to 1. Under these conditions, the current in the horizontal conductive line 160$_j$ of the light sensor array 102 corresponds to the sum of red components of all color patches 142$_1$–142$_N$. In order to effect a control, that current value $I_j$ is preferably used directly as a feedback signal or alternatively compared with an expected value, to produce a feedback signal which is useful for changing the concentration of red toner in a one of the developer units 44–46. Complete closed loop control is thereby effected. In instances where the toner colors are yellow, cyan and magenta, color filters matching those three fundamental colors would be used in place of the red, green and blue filters discussed above. In addition, more complicated mappings are possible where, for example, to measure the cyan component of the color patches, some combination of $T_{bij}$, $T_{gij}$, and $T_{rij}$ is employed. Overall, with an arbitrary linear mapping of a large number of color patches, it is possible to generate very complicated yet subtle control signals for use by the electrophotographic printing machine 10.

A significant important advantage of the instant invention is that the matrix $T_{total}$ which performs the mapping, is entirely programmable by the machine main processing unit 120 by simply selecting the appropriate spatial light modulator values in the array 104 over each of the sensors. The matrix itself comprising the spatial light modulator array 104 may be static, such as through use of a piece of photographic film for fixed feedback, or, preferably, is dynamic through the use of a liquid-crystal device bonded onto the sensor array.

For the preferred dynamic system, the optimum matrix $T_{total}$ is determined by appropriate in situ training algorithms. The optimum matrix is different for each machine type. That is, the transmission coefficients assume different values when the modulator array is trained in the various copy machine types or styles. As a training algorithm example, one preferred method of training is to purposely move the electrophotographic printing system away from its nominal operating set point and then monitor changes in the currents $I_{out}$ on the plurality of horizontal conductive lines 160$_1$–160$_M$. Then, by realizing what feedback signals $I_{out}$, were desired, presumably signals opposite the purposeful perturbation, the light modulator matrix is adjusted in situ to produce the proper output control signals by well-known algorithms as appreciated by those skilled in the art. The advantage of in-situ training of the present invention is very powerful and allows control algorithms to be tailored to a given electrophotographic printing machine at a given time. The in situ also permits non-idealities in the sensor/imaging system to be compensated for, since the training is adaptive.

As a further, more detailed example of a preferred training method for establishing the plurality of transmission coefficients of the spatial light modulator, a first step includes establishing an equilibrium condition in a subject copy machine. The equilibrium condition is one in which all machine subsystems are operating according to desired levels and, overall, good quality copies are being generated by the machine. Under this condition, the current vector $I_{out}$ from the sensor array is collected and stored.

Next, one or more of the subsystems in the copy machine are moved off from the normal set point. Once again, the current vector $I_{out}$ is observed and recorded. The currents reflect the changes to the color test patch resulting from the subsystems deviations away from the set point. Environmental changes are also contemplated here such as, for example, the temperature and humidity within which the copy machine is operated. A set of current vectors are collected by offsetting each of the subsystems in turn and/or in groupings.

For each vector resulting from offsetting one or more subsystems from its set point, a desired set of output currents may be obtained by well known techniques. As an example, an expected desired set of currents would reflect a change opposite to the offsetting influence. By combining the art of output vectors $I_{out}$ obtained when the subsystems are altered with a desired set of output vectors $I_{our}$, the light modulator array matrix $T_{total}$ is trained. Once trained, the matrix may be realized in photographic filters or hardwired or preferably pre-programmed for each copy machine at the source of manufacture such as by storing transmission parameters in a memory for example.

Figure 7:
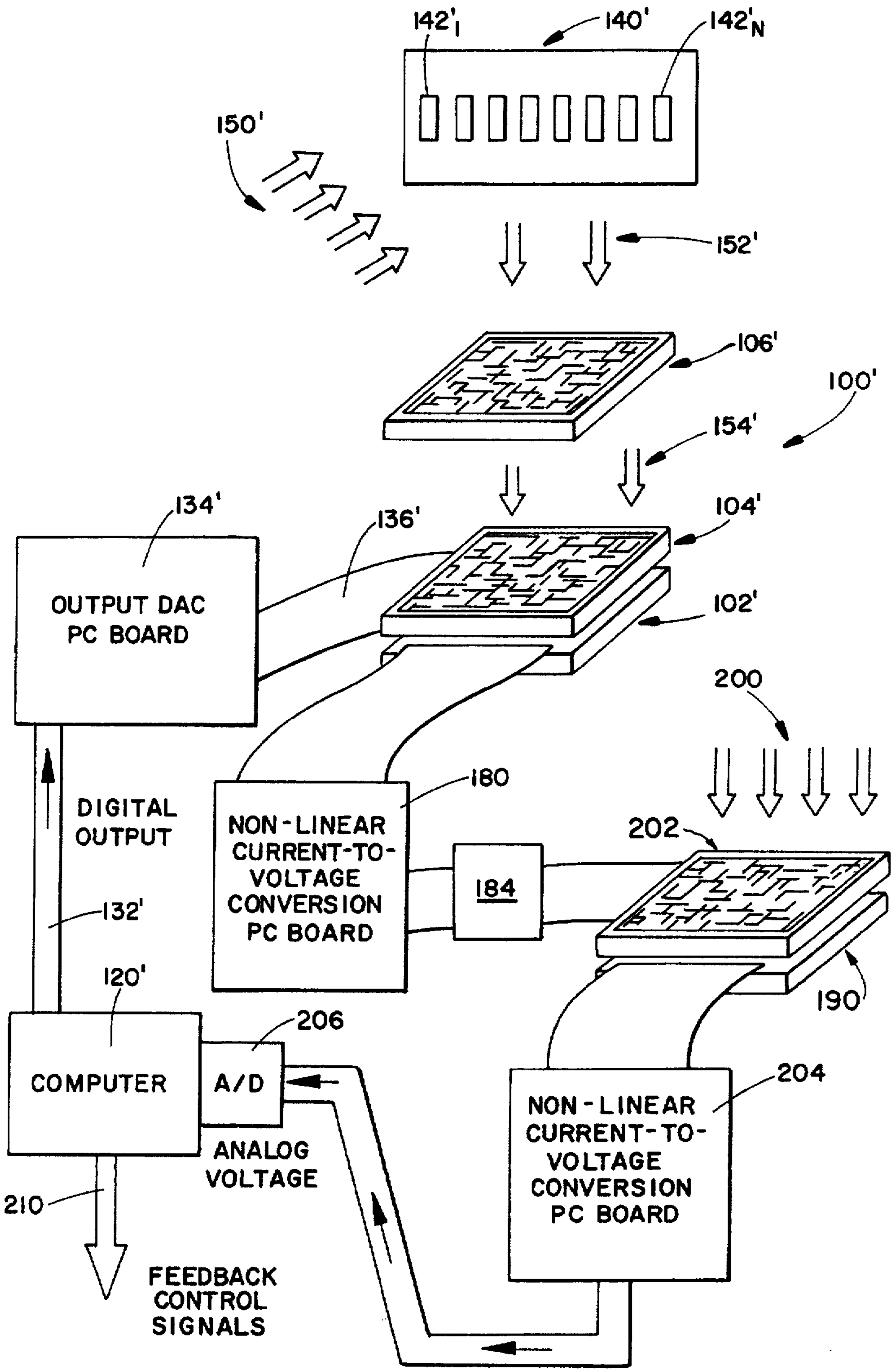
FIG. 7 is a schematic illustration of a second preferred color control processing system embodiment of the present invention including a neural network processing arrangement; and, FIG. 8 is a schematic functional view of the second preferred embodiment of the present invention showing the signal interconnections between the various structural elements.

With reference now to FIG. 7, a second preferred embodiment of the detector array method and apparatus according to the present invention is illustrated. In that Figure, the sensor array 102 is extended, to produce non-linear mappings, via a neural network architecture, which substantially extends the ability of the system to perform nearly arbitrary machine control based on the color information. The neural network architecture illustrated in the Figure is trainable in-situ, using conventional training algorithms such as the well-known backpropagation to allow the control to be tailored for each individual electrophotographic printing machine. The second preferred embodiment color control processing system is represented in FIG. 8 in a schematic functional view showing the signal interconnections between the various structural elements.

Figure 8:
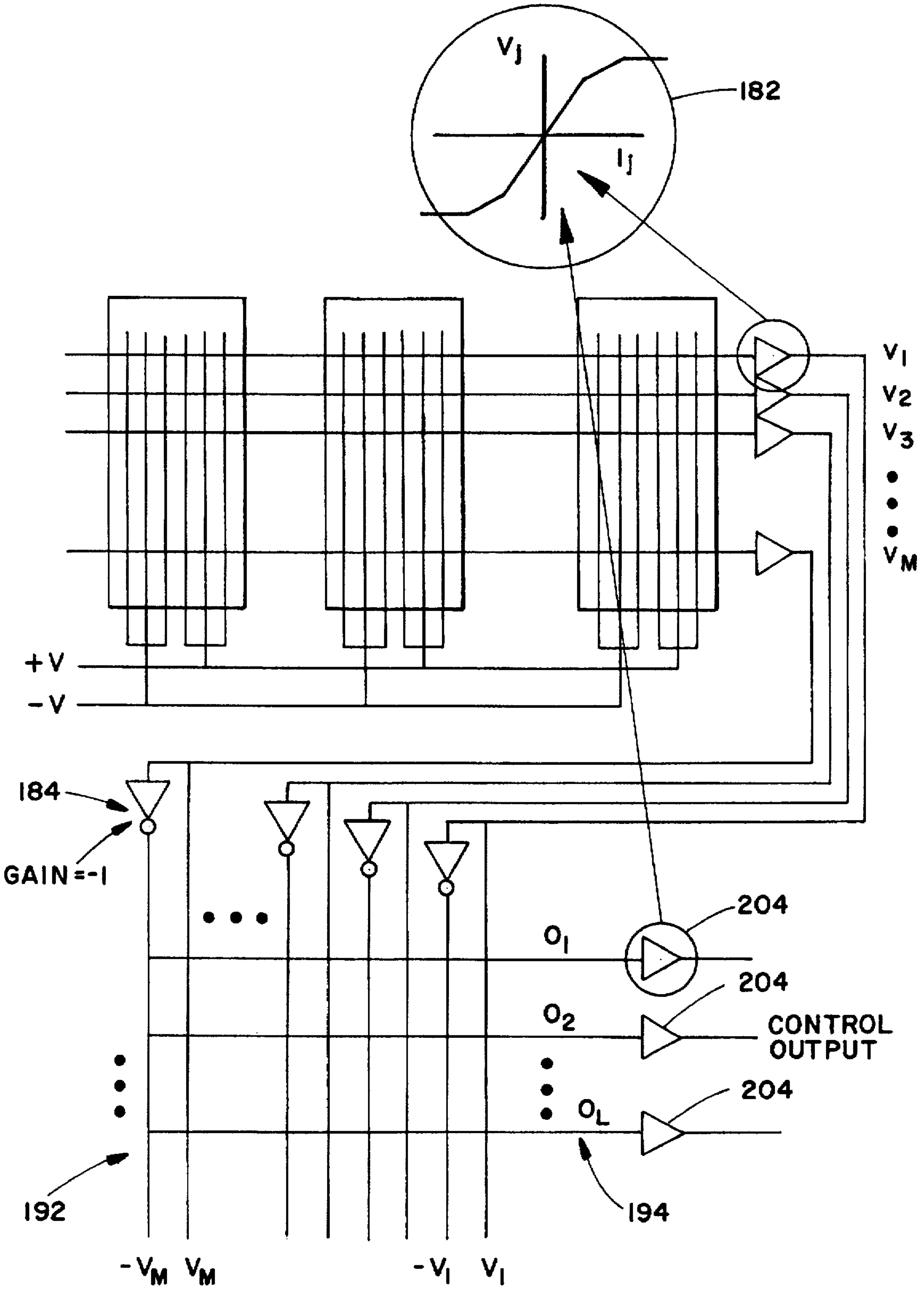

Referring to FIGS. 7 and 8 together, the sensor array 102' is extended to function as a three-layer perceptron neural network 100'. In the system illustrated, each of the various components having reference numerals in common with those of the system illustrated in FIG. 2, include the same or similar overall function. However, in order to implement the neural network architecture, a plurality of additional system components are required for full direct feedback preferably to the various subsystems of the copier on to the machine main processing unit 120.

In general, as discussed above in connection with the first preferred embodiment, the sensor array 102' generates analog current signals. However, in the second embodiment, the analog current signals are converted to voltage Signals by a non-linear current to voltage conversion unit 180. The unit preferably transforms the analog current signals to analog voltage signals using a sigmoidal transformation function 182 which is best illustrated in FIG. 8.

The outputs from the non-linear current to voltage conversion unit 180 $V_1$–$V_M$ are in turn conditioned by a voltage pairing circuit 184 which splits each of the individual voltages $V_j$ into voltage pairs $V_j$ and $-V_j$ for input into a second light sensor array 190.

The voltage pairs $V_j$ and $-V_j$ are input into a second light sensor array 190 along the vertical conductive lines 192 in the same manner as the voltages +V and −V were input into the first light sensor array 102 discussed in connection with this embodiment and the embodiment of FIG. 2. The second light sensor array 190 is exposed to a second source of incident illumination 200 through a second spatial light modulator array 202. The second light modulator array 202 is programmed directly by the machine main processing unit 120 but the connection thereto is not illustrated in the Figure for the sake of clarity. Each of the first and second modulator arrays 104 and 202 include transmission coefficients particular to the machine in which they are used. The coefficients are predetermined during manufacture and either stored onto a film patch or preferably established as a parameter in a memory.

The combination of the second light source 200 with the voltage signals $V_i$–$V_M$ on the vertical conductive lines 192 produce a set of output signals $O_1$–$O_L$ on the plurality of horizontal conductive lines $\mathbf{194}_1$–$\mathbf{194}_L$. The second light sensor array 190 is illuminated uniformly by the second light source 200 and essentially performs a second matrix transformation on the non-linearly amplified outputs from the main sensor array 102. It has been shown that such an architecture is very well suited for implementation in a neural network and that such network is trainable, using a liquid crystal device as the second spatial light modulator array 202 over the underlying photoconductive sensors of the second light sensor array 190. The training and implementation of this architecture is set forth *Trainable Optically Programmed Neural Network*, Appl. Opt. 31 (29), 6230 (1992), R. G. Stearns and *An Optically Programmed Neural Network Capable of Stand Alone Operation*, Appl. Opt., R. G. Stearns. The teachings of the above are incorporated herein by reference.

With continued reference to the system set forth in FIGS. 7 and 8, a second non-linear current to voltage conversion unit 204 performs a sigmoidal transformation operation on the current signals from the horizontal conductive lines $\mathbf{194}_1$–$\mathbf{194}_L$. The non-linear transformation generates a plurality of voltage signals $V_1$–$V_L$ which are preferably used directly by the subsystems of the copier or in turn fed back as a group to the main machine processing unit 120 through an analog to digital conversion unit 206. When the signals from the conversion unit 204 are not used directly, toner control and other feedback signals 210 are generated by the main machine processing unit for adjusting the toner concentration levels charging or developing voltage levels or other operational parameters.

With the neural network architecture of FIGS. 7 and 8, the system performs arbitrary mappings of the color patch information into control signals 210. These mappings are adaptively determinable, in-situ by well-known training techniques such as the backpropagation technique. As an example of a training technique, arbitrary perturbations about a nominal operation point are instituted whereupon the outputs of the neural network are observed. The network, including the first and second modulator arrays 104' and 202, is then trained to produce the proper control signals for stable color reproduction. According to such well known techniques such as backpropagation algorithms, the training is accomplished by realizing how the network behaves as the system is offset from and then returned back to the desired nominal operating point. The modulator array transmission weights are adjusted for each perturbation iteration until a settling point or equilibrium is established.

The invention has been described with reference to the preferred embodiments. Obviously, modifications and alterations will occur to others upon the reading and understanding of this specification. It is our intention to include all such modifications and alterations, insofar as they come within the scope of the appended claims and any equivalents thereof.

Having thus described the invention, we now claim:

1. A method of determining the quality of printed colors from a test color patch produced in a color printing apparatus, the method comprising:

generating a color patch by the color printing apparatus;

producing a reflected light source $C_{total}$ by reflecting a first light source from the color patch;

passing $1^{st}$ to $Z^{th}$ portions of the reflected light source $C_{total}$ through respective $1^{st}$ to $Z^{th}$ color filters to produce a set of Z primary color light signals $C_1 \ldots C_Z$;

producing a set of Z×M attenuated color light signals by selectively attenuating the set of Z primary color light signals $C_1 \ldots C_Z$ with a spatial light modulator unit including a Z×M array of spatial light modulators having transmission coefficients given by:

$$T_{total} = \begin{bmatrix} T_{11} & \ldots & T_{1M} \\ T_{21} & \ldots & T_{2M} \\ \cdot & & \cdot \\ \cdot & & \cdot \\ \cdot & & \cdot \\ T_{21} & \ldots & T_{ZM} \end{bmatrix}$$

receiving the set of Z×M attenuated color light signals on a Z×M photoconductive array corresponding to said Z×M array of spatial light modulators; and, generating a set of 1×M light flux intensity signals $I_{out}$ by the Z×M photoconductive array, each of the $1^{st}$ to $M^{th}$ light flux intensity signals corresponding to a weighted sum of light intensity of the $1^{st}$ to $Z^{th}$ portions of the reflected light source according to: $I_{out}=C_{total}*T_{total}$.

2. The method according to claim 1 further comprising the step of generating a color quality control signal for use by the color printing apparatus by comparing the generated set of 1×M light flux intensity signals $I_{out}$ with an expected color quality vector.

3. The method according to claim 2 further comprising the steps of:

adjusting the transmission coefficients of said spatial light modulator unit;

producing a second set of Z×M attenuated color light signals by selectively attenuating the set of Z primary color light signals $C_1 \ldots C_Z$ with said spatial light modulator unit including said Z×M array of spatial light modulators having second transmission coefficients given by:

$$T_{total} = \begin{bmatrix} T_{11} & \ldots & T_{1M} \\ T_{21} & \ldots & T_{2M} \\ \cdot & & \cdot \\ \cdot & & \cdot \\ \cdot & & \cdot \\ T_{Z1} & \ldots & T_{ZM} \end{bmatrix}$$

receiving the second set of Z×M attenuated color light signals on said Z×M photoconductive array corresponding to said Z×M array of spatial light modulators; and, generating a second set of 1×M light flux intensity signals $I'_{out}$ by the Z×M photoconductive array, each of the second $1^{st}$ to $M^{th}$ light flux intensity signals corresponding to a weighted sum of light intensity of the $1^{st}$ to $Z^{th}$ portions of the reflected light source according to: $I'_{out}=C'_{total}, T'_{total}$.

4. The method according to claim 3 further comprising the step of generating a second color quality control signal for use by the color printing apparatus by comparing the second generated set of 1×M light flux intensity signals $I'_{out}$ with a second expected color quality vector.

5. A system for color quality control by processing color patch information to generate color quality feedback signals for use by an operatively associated printing apparatus, the system comprising:

a light sensor matrix for generating a first set of feedback signals, during a normal operation time of the operatively associated printing apparatus, based on a first matrix of light signals incident on the light sensor matrix;

a color filter array disposed between the light sensor matrix and a color patch, provided by the operatively associated printing apparatus, the color filter array filtering light reflected from the color patch to produce a set of filtered light signals;

a spatial light modulator array disposed between said color filter array and said light sensor matrix, for attenuating said set of filtered light signals to generate a matrix of attenuated light signals for use by the light sensor matrix as said first matrix of light signals; and, a plurality of signal lines for directly communicating said first set of feedback signals to said operatively associated printing apparatus.

6. The system according to claim 5 wherein said light sensor matrix is a photoconductive matrix for generating a first set of analog current signals based on said first matrix of light signals incident on the photoconductive matrix.

7. The system according to claim 6 wherein said spatial light modulator is responsive to a matrix of attenuation signals from an external signal source for selectively attenuating said set of filtered light signals to generate said matrix of attenuated light signals.

8. The system according to claim 7 further comprising means for performing a non-linear matrix mapping of said set of filtered light signals into said first set of feedback signals.

9. The system according to claim 8 wherein said means for preforming said non-linear matrix mapping includes:

a second spatial light modulator array responsive to said first set of analog current signals from the photoconductive matrix and a second light signal to generate a second matrix of attenuated light signals; and, a second light sensor matrix for generating a second set of analog current signals based on said second matrix of attenuated light signals.

10. A color control system in a printing apparatus, configured to generate a color patch on one of a drum or belt of the printing apparatus or document in the printing apparatus, during a printing operation, the system comprising:

a color filter array for filtering light reflected from the color patch by said printing apparatus to produce a first set of filtered light signals, wherein the color patch is one of the drum, belt or document;

a light modulator array for attenuating the light reflected from the color patch to produce a first set of attenuated light signals, wherein the arrangement relationship between the color filter and the light attenuator array is alterable, whereby the light reflected from the color patch can be first filtered then attenuated or first attenuated and then filtered;

a light sensor array for generating a first set of feedback signals based on a first set of light signals incident on the light sensor array which have been filtered and attenuated; and, a plurality of signal lines for communicating said first set of feedback signals to said printing apparatus, during normal printer operation.

11. The color control system according to claim 10 wherein said light modulator array is a static pre-programmed spatial light modulator array.

12. The color control system according to claim 10 wherein said light modulator array is programmable and responsive to a set of attenuation control signals from an external source for selectively attenuating said first set of filtered light signals.

13. The color control system according to claim 10 further comprising means for performing a non-linear matrix mapping of said light reflected from said color patch into said first set of feedback signals.

14. The color control system according to claim 13 wherein said means for performing said non-linear matrix mapping includes:

a second light modulator array responsive to i) signals from said light sensor array and ii) a second light source for generating a set of attenuated light signals; and, a second light sensor array for generating a second set of feedback signals.

15. A color control system comprising:

a light sensor device for generating a plurality of feedback signals in response to a first plurality of light signals incident on the light sensor device;

a programmable spatial light modulator array for attenuating light reflected from a color patch to produce a plurality of attenuated light signals, responsive to a set of attenuation signals;

a color filter device for filtering said plurality of attenuated light signals to produce said first plurality of light signals for use by said light sensor device; and, a plurality of signal lines for communicating said plurality of feedback signals from said color control system.

16. The color control system according to claim 15 wherein said color filter device is disposed between said programmable spatial light modulator array and said light sensor device.

17. The color control system according to claim 17 wherein said light sensor device is a photoconductive array for generating a first set of analog signals as said plurality of feedback signals.

18. The color control system according to claim 17 further comprising means for performing a non-linear mapping of said light reflected from said printed color patch into said plurality of feedback signals.

19. The color control system according to claim 18 wherein said means for performing said non-linear mapping includes:

a second programmable spatial light modulator array responsive to i) said first set of analog signals from the photoconductive array and ii) a second light signal to produce a second plurality of attenuated light signals; and, a second light sensor device for generating a second set of analog signals as said plurality of feedback signals based on said second plurality of attenuated light signals.

20. A method of determining the quality of printed colors from a test color patch produced in a color printing apparatus, the method comprising:

generating a color patch by the color printing apparatus;

producing a reflected light source by reflecting a first light source from the color patch;

passing $1^{st}$ to $Z^{th}$ portions of the reflected light source through respective $1^{st}$ to $Z^{th}$ color filters to produce a set of Z primary color light signals;

producing a set of Z×M attenuated color light signals by selectively attenuating the set of Z primary color light signals with a spatial light modulator unit including a Z×M array of spatial light modulators having transmission coefficients given by:

$$T_{total} = \begin{bmatrix} T_{r11} & T_{r12} & \cdots & T_{r1M} \\ T_{g11} & T_{rg12} & \cdots & T_{1M} \\ T_{b11} & T_{b12} & \cdots & T_{b1M} \\ T_{r21} & T_{r22} & \cdots & T_{r2M} \\ T_{g21} & T_{g22} & \cdots & T_{g2M} \\ T_{b21} & T_{b22} & \cdots & T_{b2M} \\ \cdot & \cdot & & \cdot \\ \cdot & \cdot & & \cdot \\ \cdot & \cdot & & \cdot \\ T_{rN1} & T_{rN2} & \cdots & T_{rNM} \\ T_{gN1} & T_{gN2} & \cdots & T_{gNM} \\ T_{bN1} & T_{bN2} & \cdots & T_{bNM} \end{bmatrix}$$

receiving the set of Z×M attenuated color light signals on a Z×M photoconductive array corresponding to said Z×M array of spatial light modulators;

generating a set of 1×M light flux intensity signals $I_{out}$ by the Z×M photoconductive array, each of the $1^{st}$ to $M^{th}$ light flux intensity signals corresponding to a weighted sum of light intensity of the $1^{st}$ to $Z^{th}$ portions of the reflected light source, according to: $I_{out}=C_{total}*T_{total}$.

* * * * *